(12) United States Patent
Fwu et al.

(10) Patent No.: US 9,264,980 B2
(45) Date of Patent: Feb. 16, 2016

(54) CARRIER SEGMENT SUPPORT FOR WIRELESS NETWORKS

(75) Inventors: Jong-Kae Fwu, Sunnyvale, CA (US); Huaning Niu, Milpitas, CA (US); Ping Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 13/995,160

(22) PCT Filed: Sep. 30, 2011

(86) PCT No.: PCT/US2011/054356
§ 371 (c)(1),
(2), (4) Date: Jun. 17, 2013

(87) PCT Pub. No.: WO2012/134533
PCT Pub. Date: Oct. 4, 2012

(65) Prior Publication Data
US 2013/0265982 A1  Oct. 10, 2013

Related U.S. Application Data

(60) Provisional application No. 61/471,042, filed on Apr. 1, 2011.

(51) Int. Cl.
*H04W 48/10* (2009.01)
*H04B 7/04* (2006.01)
(Continued)

(52) U.S. Cl.
CPC ............. *H04W 48/10* (2013.01); *H04B 7/0456* (2013.01); *H04B 7/0486* (2013.01);
(Continued)

(58) Field of Classification Search
CPC ............. H04B 1/50; H04B 1/52; H04B 1/54; H04B 7/2615; H04J 3/1682; H04L 5/0007; H04L 5/143; H04L 12/5693; H04L 12/5695; H04L 47/10; H04L 47/15; H04L 47/6225; H04L 47/5679; H04W 8/26; H04W 16/10; H04W 16/14; H04W 16/16; H04W 24/00; H04W 28/04; H04W 28/18; H04W 28/20; H04W 28/24; H04W 28/26; H04W 48/08; H04W 72/00; H04W 72/04; H04W 72/12; H04W 72/06; H04W 72/042; H04W 72/044; H04W 72/082; H04W 72/085; H04W 72/0453; H04W 72/0493; H04W 76/02; H04W 80/04; H04W 84/08; H04W 84/12; H04W 84/18; H04W 88/06; H04W 88/08; H04W 88/0478
See application file for complete search history.

(56) References Cited

U.S. PATENT DOCUMENTS

2010/0195586 A1  8/2010  Choi et al.
2012/0087331 A1  4/2012  Seo et al.

FOREIGN PATENT DOCUMENTS

KR  2010-0130154 A  12/2010
WO  2010/016737 A2  2/2010
(Continued)

OTHER PUBLICATIONS
Extended European Search report received for European Patent Application No. 11862503.7, mailed on Aug. 13, 2014, 9 pages.
(Continued)

*Primary Examiner* — Alpus H Hsu
*Assistant Examiner* — Dharmesh Patel
(74) *Attorney, Agent, or Firm* — Alpine Technology Law Group LLC

(57) ABSTRACT

Briefly, in accordance with one or more embodiments, a base transceiver station such as an Enhanced Node B allocates a first bandwidth for operation with a first set of remote devices which may comprise user equipment (UE), and allocates at least one or more bandwidth segments outside of the first bandwidth for operation with a second set of remote devices which mag comprise user equipment (UE). Remote devices of the first set are capable of operating within the first bandwidth, and remote devices of the second set are capable of operating within the first bandwidth and within the bandwidth segments outside of the first bandwidth. The devices of the first set comprise legacy devices, and devices of the second set comprise advanced devices.

34 Claims, 7 Drawing Sheets

(51) Int. Cl.

| | | |
|---|---|---|
| *H04B 7/06* | (2006.01) | |
| *H04B 5/00* | (2006.01) | |
| *H04L 25/02* | (2006.01) | |
| *H04L 25/03* | (2006.01) | |
| *H04L 12/26* | (2006.01) | |
| *H04L 12/721* | (2013.01) | |
| *H04L 29/06* | (2006.01) | |
| *H04W 4/00* | (2009.01) | |
| *H04W 24/00* | (2009.01) | |
| *H04W 24/02* | (2009.01) | |
| *H04W 24/10* | (2009.01) | |
| *H04W 28/04* | (2009.01) | |
| *H04W 28/08* | (2009.01) | |
| *H04W 48/12* | (2009.01) | |
| *H04W 52/02* | (2009.01) | |
| *H04W 52/14* | (2009.01) | |
| *H04W 52/18* | (2009.01) | |
| *H04W 72/00* | (2009.01) | |
| *H04W 72/04* | (2009.01) | |
| *H04W 88/02* | (2009.01) | |
| *H04W 88/08* | (2009.01) | |
| *H04W 92/20* | (2009.01) | |
| *H04L 5/00* | (2006.01) | |

(52) U.S. Cl.
CPC ........... *H04B 7/0632* (2013.01); *H04B 7/0639* (2013.01); *H04L 5/003* (2013.01); *H04L 5/0037* (2013.01); *H04L 5/0094* (2013.01); *H04L 25/0206* (2013.01); *H04L 25/0226* (2013.01); *H04L 25/03343* (2013.01); *H04L 43/50* (2013.01); *H04L 45/70* (2013.01); *H04L 65/608* (2013.01); *H04W 4/005* (2013.01); *H04W 24/00* (2013.01); *H04W 24/02* (2013.01); *H04W 24/10* (2013.01); *H04W 28/08* (2013.01); *H04W 48/12* (2013.01); *H04W 52/0216* (2013.01); *H04W 52/146* (2013.01); *H04W 52/18* (2013.01); *H04W 72/042* (2013.01); *H04W 72/0413* (2013.01); *H04W 72/0453* (2013.01); *H04L 5/005* (2013.01); *H04L 25/0328* (2013.01); *H04L 2025/03426* (2013.01); *H04L 2025/03802* (2013.01); *H04W 28/048* (2013.01); *H04W 72/00* (2013.01); *H04W 88/02* (2013.01); *H04W 88/08* (2013.01); *H04W 92/20* (2013.01)

(56) References Cited

FOREIGN PATENT DOCUMENTS

| | | |
|---|---|---|
| WO | 2010/140828 A2 | 12/2010 |
| WO | 2012/134533 A1 | 10/2012 |

OTHER PUBLICATIONS

Supplementary European Search report received for European Patent Application No. 11862503.7, mailed on Aug. 29, 2014, 1 page.
Docomo, NTT, "Comparison of Carrier Segment and Extension Carrier for Contiguous Carrier Aggregation", 3GPP TSG RAN WG1 Meeting #59bis, R1-100491, Jan. 12, 2010, 5 pages.
ETSI TS 136 211, "LTE, Evolved Universal Terrestrial Radio Access (E-UTRA), Physical channels and modulation", 3GPP TS 36.211, Version 8.8.0, Release 8, Oct. 2009, 85 pages.
ETSI TS 136 212, "LTE, Evolved Universal Terrestrial Radio Access (E-UTRA), Multiplexing and channel coding", 3GPP TS 36.212, Version 8.8.0, Release 8, Jan. 2010, 62 pages.
ETSI TS 136 213, "LTE, Evolved Universal Terrestrial Radio Access (E-UTRA), Physical layer procedures", 3GPP TS 36.213, Version 8.8.0, Release 8, Oct. 2009, 79 pages.
International Search Report and Written Opinion Received for PCT Patent Application No. PCT/US2011/054356, mailed on Mar. 9, 2012, 10 pages.
International Preliminary Report on Patentability with Written Opinion Received for PCT Patent Application No. PCT/US2011/054356, mailed on Oct. 10, 2013, 7 Pages.

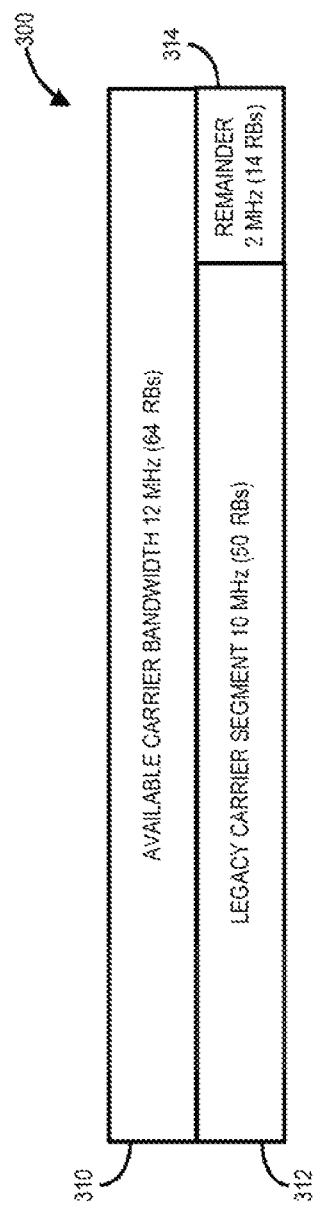

US 9,264,980 B2

CARRIER SEGMENT SUPPORT FOR WIRELESS NETWORKS

CROSS-REFERENCE TO RELATED APPLICATIONS

The present application claims the benefit of U.S. Provisional Application No. 61/471,042 filed Apr. 1, 2011 (P37663Z). Said Application No. 61/471,042 is hereby incorporated herein by reference in its entirety.

BACKGROUND

In current wireless networks such as those compliant with a Third Generation Partnership Project (3GPP) Long Term Evolution (LTE) standard, a limited number of resource blocks (RBs) is specified for different bandwidths, for example. If the number of resource blocks available for deployment by a given network operator is larger than the closest specified one, those resource blocks outside of the closest supported bandwidth are wasted. Furthermore, a given stand-alone component carrier introduces some overheads in terms of guard bands, system information, control signals, control channels, and so on, that may be reduced by simple bandwidth extension of a component carrier, rather than defining a stand-alone component carrier. Additionally, asymmetric downlink/uplink (DL/UL) bandwidths are not supported by the current LTE Rel-10 standard, for example, a DL carrier with a 7 MHz bandwidth and an UL carrier with a 5 MHz bandwidth. Evolving networks should provide carriers segment schemes to utilize the additional available resource blocks mentioned in the above scenarios to enhance system throughputs and complement the component carrier aggregation for Rel-10.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

FIG. 2 is a diagram of example carrier segments and resource blocks available for carrier segment allocation in accordance with one or more embodiments;

FIG. 3 is a diagram of a carrier segment allocation for a given available bandwidth using a legacy carrier segment in accordance with one or more embodiments;

Figure 1:
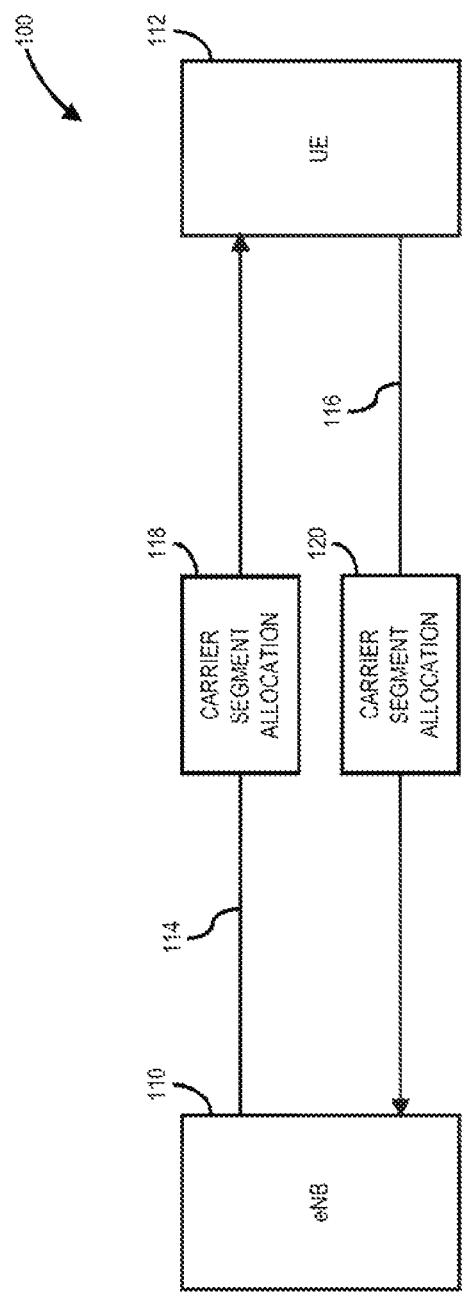
FIG. 1 is a diagram of a network capable of carrier segment allocation in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, hut yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a network capable of carrier segment allocation in accordance with one or more embodiments will be discussed. As shown in FIG. 1, network 100 may be compliant with a Third Generation Partnership Project (3GPP) Long Term Evolution Advanced (LTE Advanced) standard and may include abuse transceiver station or enhanced Node B (eNB) 110 communicating with a mobile station or user equipment (UE) 112. Although an LTE or LTE Advanced network 100 is discussed herein for purposes of example, it is noted that network 100 may be compliant with other network standards such as a Worldwide interoperability for Microwave Access (WiMAX) or WiMAX-II protocol in accordance with a Institute for Electrical and Electronics Engineers (IEEE) 802.16e or IEEE 802.16m standard, and the scope of the claimed subject matter is not limited in this respect.

In one or more embodiments, eNB 110 may communicate with UE 112 via a downlink channel 114 and an uplink channel 116. Depending on the resources available for network 100, the downlink channel 114 may include a carrier segment allocation 118 for downlink communications from the eNB 110 to the UE 112, and the uplink channel 116 may include a carrier segment allocation 120 for uplink communication from the UE 112 to the eNB 110. In one or more embodiments, the carrier segment allocation may be symmetric for the downlink and the uplink in which the bandwidth of the downlink channel 114 is the same as the bandwidth of the uplink channel 116 with the same allocation scheme. In one or more alternative embodiments the carrier segment allocation may be asymmetric wherein the bandwidth of the downlink channel 114 is different, typically no smaller, than the bandwidth of the uplink channel 116. In further alternative embodiments, the carrier segment allocation 118 for the downlink channel 114 may employ a different allocation scheme than the carrier segment allocation 120 for the uplink channel 116. However, these are merely example allocation schemes, and the scope of the claimed subject matter is not limited in these respects. An example of carrier segments and resource blocks available for allocation is shown in and described with respect to FIG. 2, below.

Referring now to FIG. 2, a diagram of example carrier segments and resource blocks available for carrier segment allocation in accordance with one or more embodiments will be discussed. In the example shown in FIG. 2, the chart 200 illustrates the bandwidth segments 210 and corresponding resource blocks (RBs) 212 that are available for allocation in a given wireless network standard, for example in a Long Term Evolution (LTE) standard. In some embodiments, a legacy device may be compliant with Release 8, Release 9, or Release 10 of the LTE standard, and an advanced device may be compliant with a Release 11 and/or a future release of the LTE standard such as LTE Advanced, although the scope of the claimed subject matter is not limited in this respect. Thus, where network 100 of FIG. 1 comprises an LTE network, the carrier segment allocation 118 for the downlink channel 114 and the carrier segment allocation 120 for the uplink channel 116 may be based on segments having a bandwidth of 1.4 MHz, 3 MHz, 5 MHz, 10 MHz, 15 MHz, or 20 MHz, and resource blocks of 6 RBs, 15 RBs, 25 RBs, 50 RBs, 75 RBs, and 100 RBs, respectively. Although chart 200 of FIG. 2 illustrates an example of available carrier segments and resource blocks available for allocation in an LTE network, it should be noted that other available carrier segments may be available depending on the standard with which network 100 is compliant, and the scope of the claimed subject matter is not limited in this respect. When network 100 is deployed to be compliant with an evolved or advanced standard, network 100 may operate with devices that are compliant with the evolved or advanced standard alongside with devices that are only capable of operating with a legacy standard. In such embodiments as discussed herein, the network 100 may need to provide a carrier segment allocation 118 that is capable of allowing devices compliant with the evolved or advanced standard to utilize such resources of the network, while being compliant with the legacy standard so that the legacy devices are still able to operate on the network 100. An example carrier segment allocation using a legacy carrier segment s shown in and described with respect to FIG. 3, below.

Referring now to FIG. 3, a diagram of a carrier segment allocation for a given available bandwidth using a legacy carrier segment in accordance with one or more embodiments will be discussed. As shown in FIG. 3, an example carrier segment allocation 300 may apply a legacy segment 312 to an available frequency allocation 310 that is available for network 100. For example, consider an available frequency allocation of 12 MHz (64 RBs) for network 100. The largest available carrier segment 312 from those available as shown in FIG. 2 is 10 MHz (50 RBs). As a result, there is a remainder segment 314 of 2 MHz (14 RBs) that is unused and therefore wasted resources, a bandwidth waste of approximately 16.6% of the total available frequency allocation 310. Alternatively, to result in a smaller remainder segment 314, an additional carrier segment of 1.4 MHz (6 RBs) could be allocated, resulting in a 0.6 MHz bandwidth waster. However, using fragmented carrier segments may result in larger overhead. In general, different methods may be utilized to resolve such inefficiency and/or waste issues, however most such solutions involve significant deviations from standards and therefore may adversely impact legacy devices. The carrier segment allocation schemes as discussed herein resolve such issues and still operate in compliance with the standards for the benefit of legacy devices. An example carrier segment allocation scheme is shown in and described with respect to FIG. 4 is shown in and described with respect to FIG. 4, below.

Figure 4:
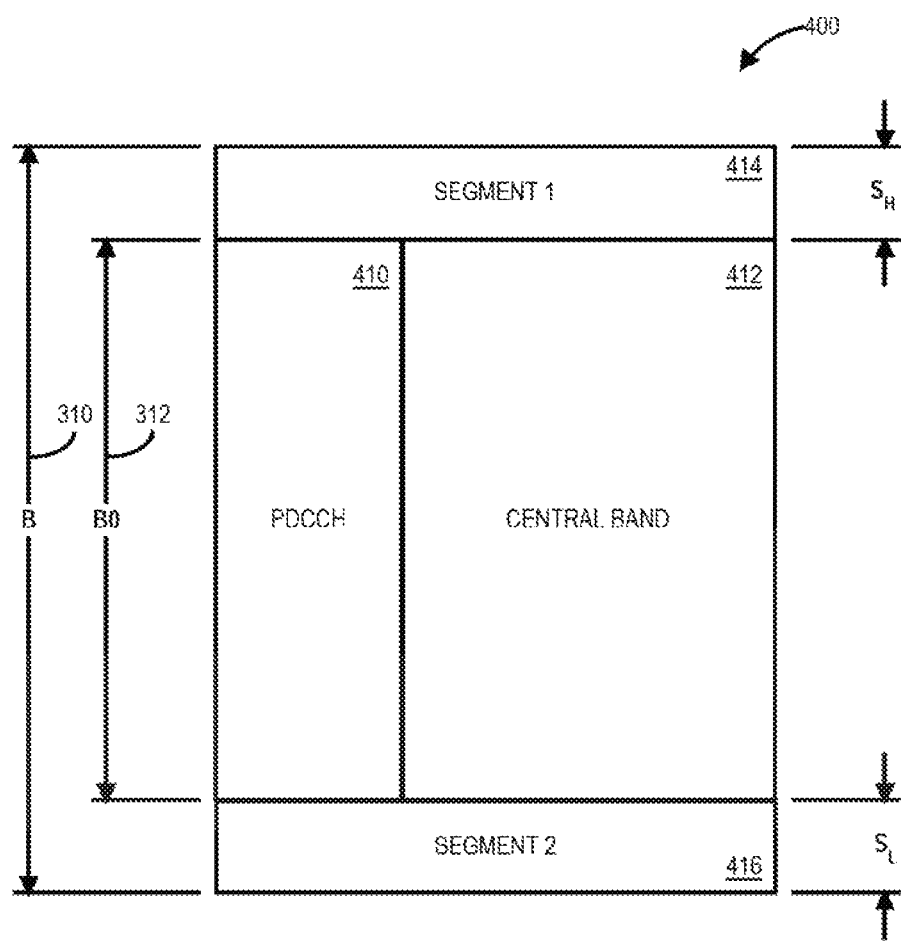
FIG. 4 is a diagram of an example allocation of carrier segment extension scheme e o a legacy carrier segment in accordance with one or more embodiments.

Referring now to FIG. 4, a diagram of an example allocation of carrier segment extension scheme to a legacy carrier segment in accordance with one or more embodiments will be discussed. As shown in FIG. 4, the example carrier segment allocation scheme 400 comprises a legacy carrier segment 312 using a legacy segment bandwidth (B0) in a total available carrier bandwidth 310 bandwidth having an extended bandwidth (B). For purposes of discussion, the legacy carrier segment 312 may have a bandwidth of 10 MHz and the total available carrier bandwidth 310 may be 12 MHz. The legacy carrier segment 312 bandwidth includes a physical downlink control channel (PDCCH) 410 or the like within a central band 412. Thus, legacy UEs 112 are capable of operating with the carrier segment allocation scheme 400 by operating within the legacy carrier segment 312 bandwidth. Outside of the legacy carrier segment 312, advanced UEs 112 capable of operating under an advanced network standard are capable of utilizing the extended bandwidth (B) of the total available carrier bandwidth 310 using resource blocks allocated in two additional side segments, a first segment (Segment 1) 414 and a second segment (Segment 2) 416. The first segment 414 may be allocated at the upper frequencies of the total available carrier bandwidth 310 and thus may be referred to as the higher segment ($S_H$), and the second segment 416 may be allocated at the lower frequencies of the total available carrier bandwidth 310 and thus may be referred to as the lower segment ($S_L$). Since the resource blocks of the first segment 414 and the second segment 416 occupy the difference in bandwidth between the total available carrier bandwidth 310 and the legacy carrier segment 312, which may be 2 MHz total in the example shown, the allocation scheme 400 utilizes the total available carrier bandwidth 310 and therefore there is no wasted bandwidth. Furthermore, the advanced UEs 112 are capable of utilizing the extended bandwidth in the first segment 414 and the second segment to take advantage of the resources of the advanced standard. An alternative carrier segment allocation scheme is shown in and described with respect to FIG. 5, below.

Figure 5:
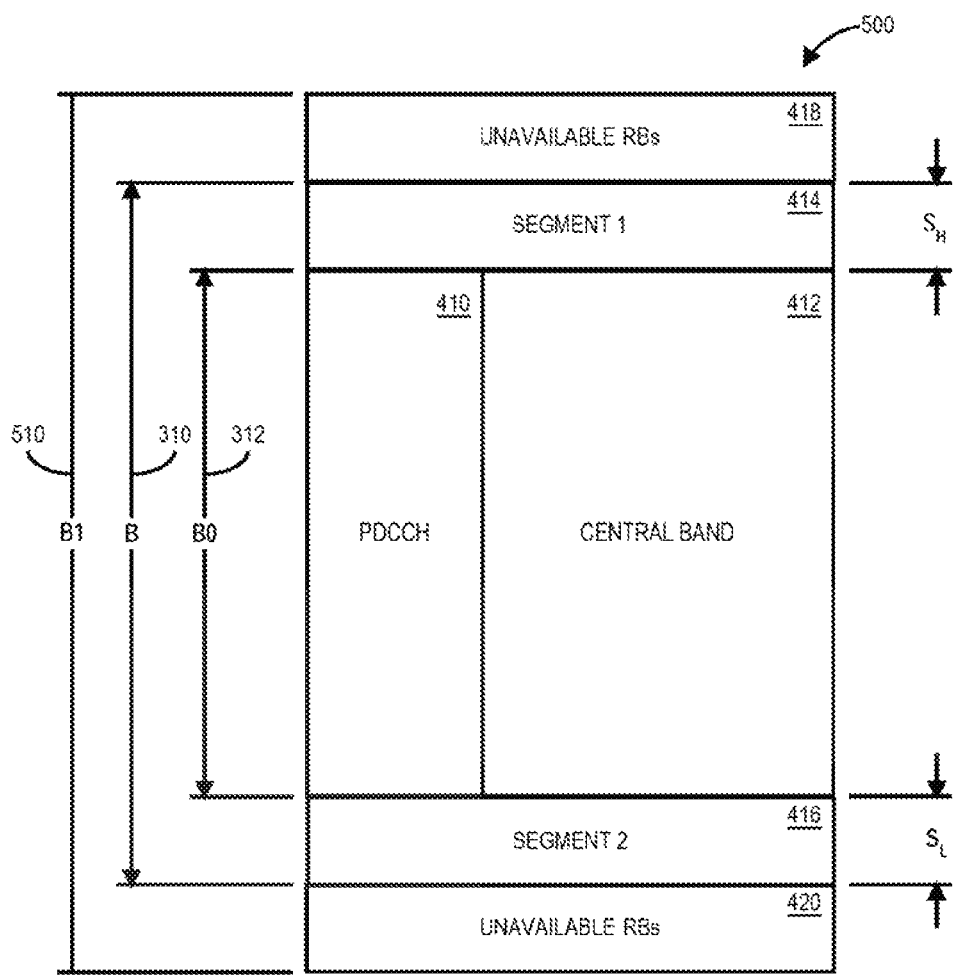
FIG. 5 is a diagram of a carrier segment allocation scheme using a next higher bandwidth in accordance with one or more embodiments.

Referring now to FIG. 5, a diagram of a carrier segment allocation scheme using a next higher bandwidth in accordance with one or more embodiments will be discussed. The carrier segment allocation scheme 500 of FIG. 5 is substantially similar to the carrier segment allocation scheme 400 of FIG. 4 wherein the entire total available carrier bandwidth 310 is utilized the first segment 414 and second segment 416 in an extended bandwidth allocation. In addition, in the carrier segment allocation scheme 500 of FIG. 5, the next higher legacy carrier segment greater than the total available carrier bandwidth 310 is utilized. Taking the carrier segment structure with the total available carrier bandwidth 310, which may be 12 MHz for example, where the central legacy carrier segment may be 10 MHz as defined in the Long Term Evolution (LTE) standards, legacy UEs 112 would be aware of this portion only, wherein the resource allocation may be made according to the central legacy carrier segment 312 defined in the LTE standard. The bandwidth of the central legacy carrier segment 312 is conveyed to the extended or advanced UEs 112, and the extended carrier bandwidth in first segment 414 and second segment 416 is available to such advanced UEs 112, wherein the resource allocation may be made according to the bandwidth closest to the next higher legacy bandwidth 510 of the legacy standard as shown. For example, where legacy carrier segment 312 has a bandwidth of 10 MHz and the total available carrier bandwidth is 12 MHz, the next higher legacy bandwidth may be 15 MHz as obtained from the chart 200 of FIG. 2. As a result, the legacy UEs 112 operate with a bandwidth 10 MHz per the legacy carrier segment 312, while advanced UEs 112 would operate with an extended bandwidth of 12 MHz of the total available carrier bandwidth 310. The remaining resource blocks 418 and 420 comprising the 3 MHz remainder of the next higher legacy bandwidth 510 are unavailable to either legacy UEs 112 or advanced UE's 112. However, such unavailable resource blocks 418 and 420 are not really wasted since they fall outside the total available carrier bandwidth 310. Within the central legacy carrier segment 312, the control and data structure conform to the legacy specifications, for example to LTE standards The two additional side segments, first segment 414 and second segment 416 comprise a group of resource blocks that are seen as a bandwidth extension for advanced UEs 112, for example operating under an LTE Advanced standard. It should be noted that the carrier segment scheme 500 is discussed using a legacy LTE standard and an LTE Advanced standard for purposes of example, and the scope of the claimed subject matter is not limited in this respect. An alternative carrier segment allocation scheme is shown in and described with respect to FIG. 6, below.

Figure 6:
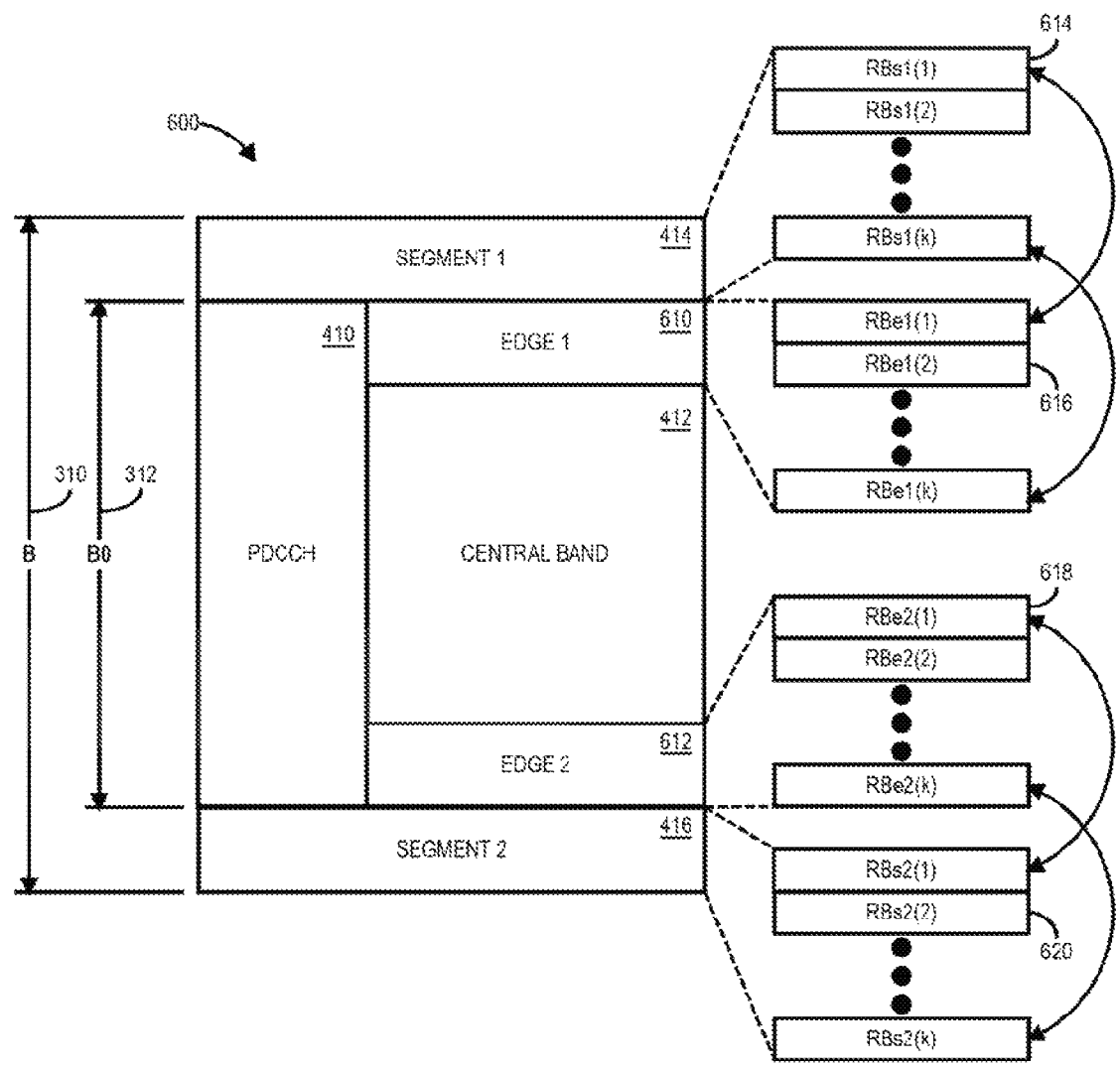
FIG. 6 is a diagram of a carrier segment allocation scheme using the available bandwidth in accordance with one or more embodiments.

Referring now to FIG. 6, a diagram of a carrier segment allocation scheme using the available bandwidth in accordance with one or more embodiments will be discussed. The carrier segment allocation scheme 600 of FIG. 6 is substantially similar to the carrier segment allocation scheme 400 of FIG. 4 wherein the entire total available carrier bandwidth 310 is utilized the first segment 414 and second segment 416 in an extended bandwidth allocation. In addition, the central legacy carrier segment 312 includes edge regions, a first edge region 610 and a second edge region 612, located at the upper and lower edges of the central band 412. In the embodiment shown in FIG. 6, the downlink carrier segment allocation scheme 600 involves pairing of resource blocks from the side segments, first segment 414 and second segment 416, with adjacent resource blocks disposed within the existing legacy carrier segment 312 disposed in edge regions, first edge region 610 and second edge region 612. In such an arrangement, advanced UEs 112 compliant with LIE Advanced Release 11 and beyond are able to take advantage of the additional available resources in the side segments, first segment 414 and second segment 416, of the extended bandwidth region of the total available carrier bandwidth 310. Various different pairing methods can be utilized with the benefit of reusing the legacy control and feedback mechanism of the LTE standard to minimize or avoid any changes to the legacy standard while fully utilizing the additional resources from the carrier segments. In general, the carrier segment allocation scheme 600 may be extended to various realizations of different pairing methods applied to the resource blocks from side segments, first segment 414 and second segment 416.

In one or more example embodiments, a wireless operator of network 100 may have a downlink carrier with bandwidth (B), for example 10 MHz, which is utilized for legacy deployment with a legacy carrier segment 312 bandwidth, for example by implementing Release 8, 9, or 10 (Rel-8/9/10) of the LTE standard. In the event the wireless operator would like to migrate from the existing Rel-8/9/10 LTE deployment with bandwidth B0 to and advanced network deployment having a total available carrier bandwidth (B) 310, for example 12 MHz. In order to effectuate the migration, the additional resource blocks (RBs) 614 of the first segment (Segment 1) 414 may be paired with the resource blocks (RBs) 616 of the first edge region (Edge 1) 610 within the existing legacy carrier segment 312, and the additional resource blocks (RBs) 620 in the second segment (Segment 2) 416 may also be paired with the resource blocks (RBs) 618 of the second edge region (Edge 2) 612. For example, a first resource block RBs1(1) of the first segment 414 is paired with a first resource block RBe1(1) of the first edge region 610. It is noted that first segment 414 (Segment 1) and first edge region 610 (Edge 1) have the same number of resource blocks, and that the second segment (Segment 2) 416 and the second edge region (Edge 2) 612 have also the same number of resource blocks in one or more embodiments. In general, where there are k number of resource blocks in each segment and edge region, resource block RBs1($k$) of the first segment 414 is paired with resource block RBe1($k$) of the first edge region 610, and resource block RBs2($k$) of the second segment 416 is paired with resource block RBe2($k$) of the second edge region (612), although the scope of the claimed subject matter is not limited in this respect.

If the resource blocks of the first edge region (Edge 1) 610 are allocated to a selected UE 112, then the corresponding paired resource blocks in the first segment (Segment 1) are implicitly also allocated to that selected UE 112 along with the resource blocks of the first edge region (Edge 1) 610. Likewise, the allocation of resource blocks in the second edge region (Edge 2) 612 to a selected UE 112 implicitly results in the allocation of the corresponding paired resource blocks of the second segment (Segment 2) 416 along with the resource blocks of the second edge region (Edge 2) 612. It is noted that in one or more embodiments legacy UEs 112 are then allocated to the resource blocks located inside the center band 412 but not to resource blocks in either of the edge regions in order to leave the resource blocks in the first edge region (Edge 1) 610 and the second edge region (Edge 2) 612 for allocation to the advanced UEs 112 so that the advanced UEs 112 are able to take advantage of the additional paired resource blocks in the first segment (Segment 1) 610 and the second edge segment (Segment 2) 612. However, in some embodiments it is permissible to allocate the resource blocks of the edge regions to legacy UEs 112 if there are no advanced UEs operating on network 100 that need to be schedule in the subframe. Furthermore, the resource blocks in the first segment (Segment 1) 414 and the second segment (Segment 2) corresponding to the orthogonal frequency division multiplexing (OFDM) symbols in the first edge region (Edge 1) 610 and the second edge region (Edge 2) utilized for the physical downlink control channel (PDCCH) 410 transmissions, or the physical hybrid automatic repeat request indicator channel (PHICH) or physical control format indicator channel (PCFICH), also may be utilized for such data transmission.

The proposed carrier segment allocation schemes shown in and described with respect to FIG. 4, FIG. 5, and FIG. 6 may be utilized to allow operation with legacy user equipment while also allowing the addition of advanced user equipment by taking advantage of additional side segments in the increased available bandwidth of advanced systems. As shown in FIG. 4, FIG. 5 and FIG. 6, the control channels and signals will remains the same, for example the physical downlink control channel (PDCCH) 410. Furthermore as shown in FIG. 6, while the additional resource blocks in extended bandwidth segments may be paired with resource blocks in edge regions within the existing legacy channel segment bandwidth, although the scope of the claimed subject matter is not limited in this respect.

In one or more embodiments, in an LTE type network there are three different downlink resource allocations, Resource Allocation Type 0, Resource Allocation Type 1, and Resource Allocation Type 2. The following is an example for the downlink Resource Allocation Type 0. Resource Allocation Type 0 involves using a bitmap to indicate which Resource Block Groups (RBGs) are allocated to the UE 112. The RBG is bandwidth dependent, and a RBG comprises contiguous resource blocks, however allocated RBGs need not be contiguous.

Let k denote the size of each RBG for the bandwidth (B0) of the legacy LTE carrier allocation segment 312 in number of resource blocks (RBs) Assume the first segment (Segment 1) 414 has a size n1 RBs and the second segment (Segment 2) 416 has a size n2 RBs, where m1=floor(n1/k) and m2=floor (n2/k) are the number of usable RBGs from each carrier segment. Given the sizes of the first segment (Segment 1) 414 and the second segment (Segment 2) 416, the corresponding first edge region (Edge 1) 610 and second edge region (Edge 2) 612 which will be paired Segment 1 and Segment 2 are determined. In the above example, the resource blocks are chosen near the band edge (Edge 1 and Edge 2) to pair with Segment 1 and Segment 2. With such a pairing mechanism, for example the m1 RBG in Segment 1 paired with Edge 1 resource, the eNB 110 may allocate RBGs in Edges 1 to some advanced UEs 112 which will double the available RBGs for data transmission by utilizing RBGs in both the first edge region (Edge 1) 610 and the first segment (Segment 1) 414 simultaneously. In one or more embodiments, the RBGs from the carrier segments are not allocated alone. When an allocation to an advanced UE 112 includes RBGs in the first edge region (Edge 1) 610, the RBGs in the first segment (Segment 1) 414 are implicitly allocated together and the actual RBGs allocated to the allocation. Allowing data transmission over an allocated carrier segment increases the cell throughput by involving a reduced or minimum overhead consumption and/or hardware complexity. The carrier segment allocation schemes are transparent to legacy UEs 112 since all the existing frames/and/or subframes and/or symbol structure, control signals, and/or resource allocations schemes remain the same for such legacy UEs 112, although the scope of the claimed subject matter is not limited in these respects.

Figure 7:
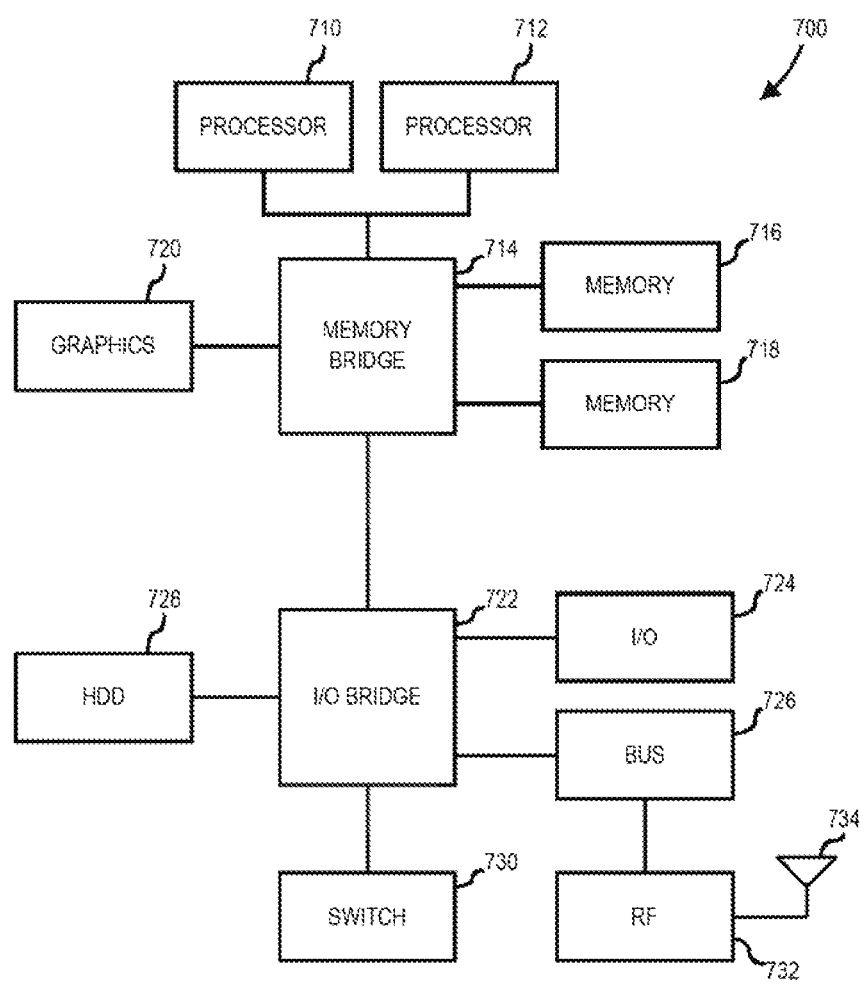
FIG. 7 is a block diagram of an information handling system capable of implementing carrier segment allocation in accordance with one or more embodiments.

Referring now to FIG. 7, a block diagram of an information handling system capable of implementing carrier segment allocation in accordance with one or more embodiments will be discussed. Information handling system 700 of FIG. 7 may tangibly embody one or more of any of the network elements of network 100 as shown in and described with respect to FIG. 1. For example, information handling system 700 may represent the hardware of eNB 110 and/or UE 112, with greater or fewer components depending on the hardware specifications of the particular device or network element. Although information handling system 700 represents one example of several types of computing platforms, information handling system 700 may include more or fewer elements and/or different arrangements of elements than shown in FIG. 7, and the scope of the claimed subject matter is not limited in these respects.

Information handling system 700 may comprise one or more processors such as processor 710 and/or processor 712, which may comprise one or more processing cores. One or more of processor 710 and/or processor 712 may couple to one or more memories 716 and/or 718 via memory bridge 714, which may be disposed external to processors 710 and/or 712, or alternatively at least partially disposed within one or more of processors 710 and/or 712. Memory 716 and/or memory 718 may comprise various types of semiconductor based memory, for example volatile type memory and/or non-volatile type memory. Memory bridge 714 may couple to a graphics system 720 to drive a display device (not shown) coupled to information handling system 700.

Information handling system 700 may further comprise input/output (I/O) bridge 722 to couple to various types of I/O systems. I/O system 724 may comprise, for example, a universal serial bus (USB) type system, an IEEE 1394 type system, or the like, to couple one or more peripheral devices to information handling system 700. Bus system 726 may comprise one or more bus systems such as a peripheral component interconnect (PCI) express type bus or the like, to connect one or more peripheral devices to information handling system 700. A hard disk drive (HDD) controller system 728 may couple one or more hard disk drives or the like to information handling system, for example Serial ATA type drives or the like, or alternatively a semiconductor based drive comprising flash memory, phase change, and/or chalcogenide type memory or the like. Switch 730 may be utilized to couple one or more switched devices to I/O bridge 722, for example Gigabit Ethernet type devices or the like. Furthermore, as shown in FIG. 7, information handling system 700 may include a radio-frequency (RF) transceiver 732 comprising RF circuits and devices coupled to one or more antennas 734 for wireless communication with other wireless communication devices and/or via wireless networks such as transmission system 100 of FIG. 1 of FIG. 2. Where the information handling system includes multiple antennas 734, RF receiver 732 may implement multiple-input, multiple output (MIMO) communication schemes, although the scope of the claimed subject matter is not limited in this respect. An example embodiment of an information handling system is shown in and described with respect to FIG. 8, below.

Figure 8:
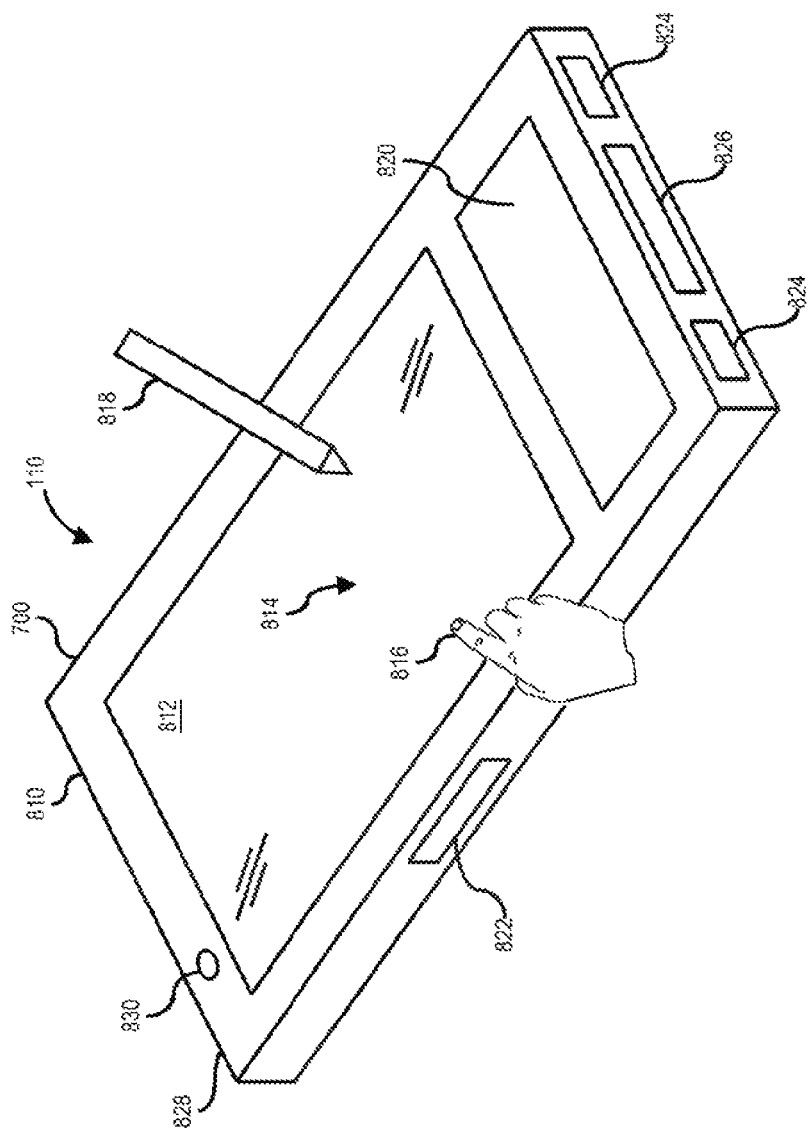
FIG. 8 is an isometric view of an information handling system of FIG. 7 capable of operating with carrier segment allocation in accordance with one or more embodiments.

Referring now to FIG. 8, an isometric view of an information handling system of FIG. 7 capable of operating with carrier segment allocation in accordance with one or more embodiments will be discussed. FIG. 8 shows an example implementation of information handling system 700 of FIG. 7 tangibly embodied as a cellular telephone, or smartphone, or a tablet type device or the like. In one or more embodiments, the information handling system 700 may comprise the user equipment (UE) 110 of FIG. 1, although the scope of the claimed subject matter is not limited in this respect. The information handling system 700 may comprise a housing 810 having a display 812 which may include a touch screen 814 for receiving tactile input control and commands via a finger 816 of a user and/or a via stylus 818 to control one or more processors 710 or 712. The housing 810 may house one or more components of information handling system 700, for example one or more processors 710 or 712, one or more of memory 716 or 718, transceiver 732. The information handling system 820 further may optionally include a physical actuator area 820 which may comprise a keyboard or buttons for controlling information handling system via one or more buttons or switches. The information handling system 700 may also include a port or slot 822 for receiving non-volatile memory such as flash memory, for example in the form of a secure digital (SD) card or a subscriber identity module (SIM) card. Optionally, the information handling system 700 may further include one or more speakers and/or microphones 824 and a connection port for connecting the information handling system 700 to another electronic device, dock, display, battery charger, and so on. In addition, information handling system 700 may include a headphone or speaker jack 828 and one or more cameras 830 on one or more sides of the housing 810. It should be noted that the information handling system 700 of FIG. 8 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to carrier segment support for wireless networks and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An article of manufacture comprising a non-transitory storage medium having instructions stored thereon that, if executed, result in:
    allocating a first bandwidth for operation with a first set of remote devices;
    allocating a first resource block within a first edge region of the first bandwidth;
    allocating a first bandwidth segment outside of the first bandwidth for operation with a second set of remote devices;
    pairing the first resource block within the first edge of the first bandwidth with a first resource block of the first bandwidth segment outside the first bandwidth;
    allocating a second resource block within a second edge region of the first bandwidth; and
    pairing the second resource block within the second edge of the first bandwidth with a second resource block of a second bandwidth segment outside the first bandwidth;
    wherein remote devices of the first set operate within the first bandwidth, and remote devices of the second set are capable of operating within the first bandwidth and within the bandwidth segments outside of the first bandwidth, and
    wherein the at least one or more bandwidth segments have a bandwidth that is equal to or nearly equal to a difference between a total available bandwidth and the first bandwidth.

2. An article of manufacture as claimed in claim 1, wherein the first set of devices comprises legacy devices and the second set of devices comprises advanced devices.

3. An article of manufacture as claimed in claim 1, wherein said allocating a first bandwidth comprises allocating a selected one of a specified carrier segment bandwidth.

4. An article of manufacture as claimed in claim 1, wherein the instructions, if executed, further result in allocating a second bandwidth comprising a selected one of a specified carrier segment bandwidth that is greater than the first bandwidth.

5. An article of manufacture as claimed in claim 1, wherein at least one of the bandwidth segments comprises frequencies higher than an upper frequency of the first bandwidth, and at least one of the bandwidth segments comprises frequencies lower than a lower frequency of the first bandwidth.

6. An article of manufacture as claimed in claim 1, wherein the instructions, if executed, further result in transmitting a physical downlink control channel (PDCCH), a physical hybrid automatic repeat request indicator channel (PHICH), or a physical control format indicator channel (PCFICH) in the first bandwidth.

7. An article of manufacture as claimed in claim 1, wherein the first bandwidth comprises a carrier segment of a Long Term Evolution (LTE) standard.

8. A method to allocate carrier segments, comprising:
    allocating a first bandwidth for operation with a first set of remote devices;
    allocating a first resource block within a first edge region of the first bandwidth;
    allocating a first bandwidth segment outside of the first bandwidth for operation with a second set of remote devices;
    pairing the first resource block within the first edge of the first bandwidth with a first resource block of the first bandwidth segment outside the first bandwidth;
    allocating a second resource block within a second edge region of the first bandwidth; and
    pairing the second resource block within the second edge of the first bandwidth with a second resource block of a second bandwidth segment outside the first bandwidth;
    allocating resource blocks within one or more edge regions of the first bandwidth;
    wherein if a resource block within the one or more edge regions is allocated for operation to one of the second set of remote devices, allocating a resource block of one of the bandwidth segments outside of the first bandwidth to the remote device, and
    wherein the at least one or more bandwidth segments have a bandwidth that is equal to or nearly equal to a difference between a total available bandwidth and the first bandwidth.

9. A method as claimed in claim 8, wherein the first set of devices comprises legacy devices and the second set of devices comprises advanced devices.

10. A method as claimed in claim 8, wherein said allocating a first bandwidth comprises allocating a selected one of a specified carrier segment bandwidth.

11. A method as claimed in claim 8, wherein at least one of the bandwidth segments comprises frequencies higher than an upper frequency of the first bandwidth, and at least one of the bandwidth segments comprises frequencies lower than a lower frequency of the first bandwidth.

12. A method as claimed in claim 8, wherein the instructions, if executed, further result in transmitting a physical downlink control channel (PDCCH), a physical hybrid automatic repeat request indicator channel (PHICH), or a physical control format indicator channel (PCFICH) in the first bandwidth.

13. A method as claimed in claim 8, wherein the first bandwidth comprises a carrier segment of a Long Term Evolution (LTE) standard.

14. An information handling system capable of implementing carrier segment allocation, comprising:
    a processor; and
    a memory coupled to the processor and comprising instructions stored thereon that, if executed, result in:
        allocating a first bandwidth for operation with a first set of remote devices;
        allocating a first resource block within a first edge region of the first bandwidth;

allocating a first bandwidth segment outside of the first bandwidth for operation with a second set of remote devices;
pairing the first resource block within the first edge of the first bandwidth with a first resource block of the first bandwidth segment outside the first bandwidth;
allocating a second resource block within a second edge region of the first bandwidth; and
pairing the second resource block within the second edge of the first bandwidth with a second resource block of a second bandwidth segment outside the first bandwidth;
wherein remote devices of the first set operate within the first bandwidth, and remote devices of the second set are capable of operating within the first bandwidth and within the bandwidth segments outside of the first bandwidth, and
wherein the at least one or more bandwidth segments have a bandwidth that is equal to or nearly equal to a difference between a total available bandwidth and the first bandwidth.

15. An information handling system as claimed in claim 14, wherein the first set of devices comprises legacy devices and the second set of devices comprises advanced devices.

16. An information handling system as claimed in claim 14, wherein said allocating a first bandwidth comprises allocating a selected one of a specified carrier segment bandwidth.

17. An information handling system as claimed in claim 14, wherein the instructions, if executed, further result in allocating a second bandwidth comprising a selected one of a specified carrier segment bandwidth that is greater than the first bandwidth.

18. An information handling system as claimed in claim 14, wherein at least one of the bandwidth segments comprises frequencies higher than an upper frequency of the first bandwidth, and at least one of the bandwidth segments comprises frequencies lower than a lower frequency of the first bandwidth.

19. An information handling system as claimed in claim 14, wherein the instructions, if executed, further result in transmitting a physical downlink control channel (PDCCH), a physical hybrid automatic repeat request indicator channel (PHICH), or a physical control format indicator channel (PCFICH) in the first bandwidth.

20. An information handling system as claimed in claim 14, wherein the first bandwidth comprises a carrier segment of a Long Term Evolution (LTE) standard.

21. An article of manufacture comprising a non-transitory storage medium having instructions stored thereon that, if executed, result in:
allocating a first bandwidth for operation with a first set of remote devices;
allocating a first resource block within a first edge region of the first bandwidth;
allocating a first bandwidth segment outside of the first bandwidth for operation with a second set of remote devices;
pairing the first resource block within the first edge of the first bandwidth with a first resource block of the first bandwidth segment outside the first bandwidth;
allocating a second resource block within a second edge region of the first bandwidth; and
pairing the second resource block within the second edge of the first bandwidth with a second resource block of a second bandwidth segment outside the first bandwidth;
wherein remote devices of the first set operate within the first bandwidth, and remote devices of the second set are capable of operating within the first bandwidth and within the bandwidth segments outside of the first bandwidth, and
wherein at least one of the bandwidth segments comprises frequencies higher than an upper frequency of the first bandwidth, and at least one of the bandwidth segments comprises frequencies lower than a lower frequency of the first bandwidth.

22. An article of manufacture as claimed in claim 21, wherein the first set of devices comprises legacy devices and the second set of devices comprises advanced devices.

23. An article of manufacture as claimed in claim 21, wherein said allocating a first bandwidth comprises allocating a selected one of a specified carrier segment bandwidth.

24. An article of manufacture as claimed in claim 21, wherein the at least one or more bandwidth segments have a bandwidth that is equal to or nearly equal to a difference between a total available bandwidth and the first bandwidth.

25. An article of manufacture as claimed in claim 21, wherein the instructions, if executed, further result in allocating a second bandwidth comprising a selected one of a specified carrier segment bandwidth that is greater than the first bandwidth.

26. An article of manufacture as claimed in claim 21, wherein the instructions, if executed, further result in transmitting a physical downlink control channel (PDCCH), a physical hybrid automatic repeat request indicator channel (PHICH), or a physical control format indicator channel (PCFICH) in the first bandwidth.

27. An article of manufacture as claimed in claim 21, wherein the first bandwidth comprises a carrier segment of a Long Term Evolution (LTE) standard.

28. An information handling system capable of implementing carrier segment allocation, comprising:
a processor; and
a memory coupled to the processor and comprising instructions stored thereon that, if executed, result in:
allocating a first bandwidth for operation with a first set of remote devices;
allocating a first resource block within a first edge region of the first bandwidth;
allocating a first bandwidth segment outside of the first bandwidth for operation with a second set of remote devices;
pairing the first resource block within the first edge of the first bandwidth with a first resource block of the first bandwidth segment outside the first bandwidth;
allocating a second resource block within a second edge region of the first bandwidth; and
pairing the second resource block within the second edge of the first bandwidth with a second resource block of a second bandwidth segment outside the first bandwidth;
wherein remote devices of the first set operate within the first bandwidth, and remote devices of the second set are capable of operating within the first bandwidth and within the bandwidth segments outside of the first bandwidth, and
wherein at least one of the bandwidth segments comprises frequencies higher than an upper frequency of the first bandwidth, and at least one of the bandwidth segments comprises frequencies lower than a lower frequency of the first bandwidth.

29. An information handling system as claimed in claim 28, wherein the first set of devices comprises legacy devices and the second set of devices comprises advanced devices.

30. An information handling system as claimed in claim 28, wherein said allocating a first bandwidth comprises allocating a selected one of a specified carrier segment bandwidth.

31. An information handling system as claimed in claim 28, wherein the at least one or more bandwidth segments have a bandwidth that is equal to or nearly equal to a difference between a total available bandwidth and the first bandwidth.

32. An information handling system as claimed in claim 28, wherein the instructions, if executed, further result in allocating a second bandwidth comprising a selected one of a specified carrier segment bandwidth that is greater than the first bandwidth.

33. An information handling system as claimed in claim 28, wherein the instructions, if executed, further result in transmitting a physical downlink control channel (PDCCH), a physical hybrid automatic repeat request indicator channel (PHICH), or a physical control format indicator channel (PCFICH) in the first bandwidth.

34. An information handling system as claimed in claim 28, wherein the first bandwidth comprises a carrier segment of a Long Term Evolution (LTE) standard.

* * * * *